Nov. 4, 1969 P. B. PRITCHARD 3,476,228
TORQUE TRANSMITTER
Original Filed April 5, 1966
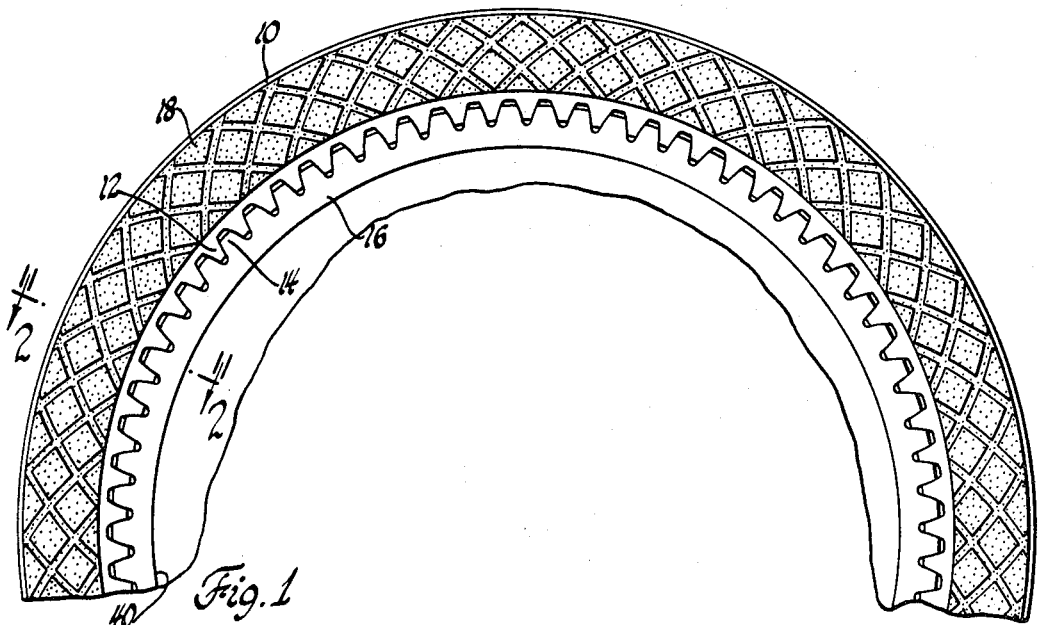
Fig. 1
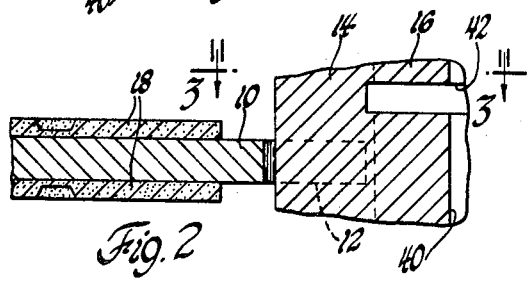
Fig. 2
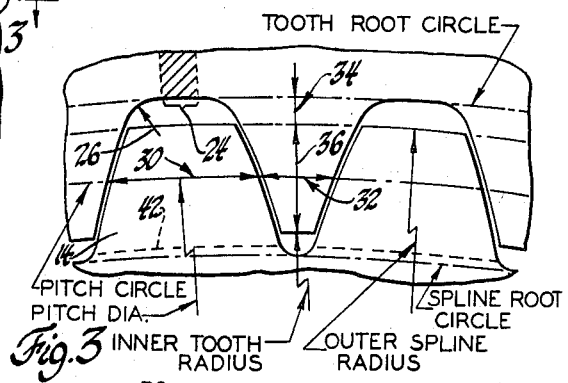
Fig. 3
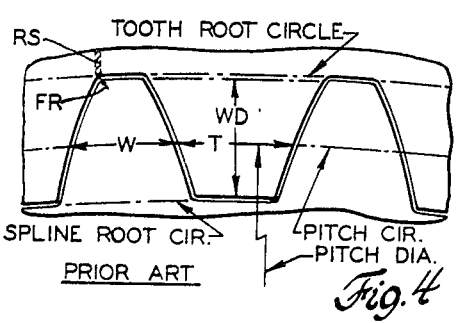
Fig. 4 PRIOR ART
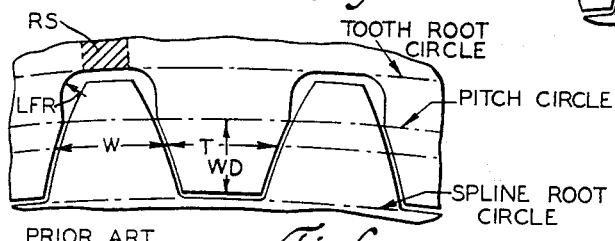
Fig. 5 PRIOR ART
Fig. 6 PRIOR ART
INVENTOR.
Paul B. Pritchard
BY
L. L. Phillips
ATTORNEY

United States Patent Office 3,476,228
Patented Nov. 4, 1969

3,476,228
TORQUE TRANSMITTER
Paul B. Pritchard, Danville, Ind., assignor to General Motors Corporation, Detroit, Mich., a corporation of Delaware
Continuation of application Ser. No. 540,239, Apr. 5, 1966. This application May 21, 1968, Ser. No. 732,013
Int. Cl. F16d *11/00, 13/60, 13/00*
U.S. Cl. 192—107     10 Claims

ABSTRACT OF THE DISCLOSURE

An annular clutch plate having teeth with a circular tooth thickness considerably less than the circular tooth space width and flats at the root diameter of the teeth which are blended with full tooth contact areas by fillets having a radius approximately equal to flat length. The clutch plate is piloted by the teeth on accommodating splines of a rotary member.

---

This is a continuation of Ser. No. 540,239, filed Apr. 5, 1966, now abandonded.

This invention relates to torque transmitters and more particularly to a tooth and spline for connecting an annular plate and a member which may rotate.

The invention is illustrated in a clutch subassembly having a clutch plate with involute teeth piloted on the involute splines of a rotary hub. The clutch plate teeth have a circular tooth thickness considerably less than the circular tooth space width measured along the pitch circle and flats of considerable length are provided at the root diameter of the teeth. The tooth root diameter is sufficiently large so that fillets having a radius approximately the length of the flats smoothly blend the flats with full involute tooth contact surfaces. The tooth and spline structure increases clutch plate fatigue life by distributing the stress over a large plate mass and relieving stress concentration at the fillets while maintaining full involute contact area. In addition, the increased spline thickness strengthens the rotary hub.

An object of this invention is to provide an annular plate with teeth having a circular tooth thickness considerably less than the circular tooth space width measured along the pitch circle.

Another object of this invention is to provide a tooth and spline connection for an annular plate and a rotary member having teeth with a circular tooth thickness less than the spline thickness, flats at the root diameter of the teeth which are blended with the tooth contacts surfaces by fillets having a radius approximately equal to flat length and full tooth and spline contact.

These and other objects of the invention will become more apparent from the following description and drawing in which:

FIGURE 1 is a partial view of a clutch subassembly having the features of this invention.

FIGURE 2 is an enlarged view taken on the line 2—2 in FIGURE 1.

FIGURE 3 is a view ttaken on the line 3—3 in FIGURE 2.

FIGURES 4, 5 and 6 show teeth and splines of the prior art drawn to the same scale and having the same pitch diameter and diametral pitch.

Referring to FIGURES 1, 2 and 3 the invention is illustrated in a clutch subassembly comprising a metal clutch plate or ring 10 having internal involute teeth 12 engaging the external involute splines 14 of a metal rotary hub 16. Friction discs 18 of suitable material are bonded to the opposite sides of plate 10 to provide the desired friction characteristics on contact with sandwiching friction plates (not shown) of the complete clutch assembly; the toothed clutch plate being loosely piloted on the splined hub to permit the clutch engagement.

In standard involute teeth as shown in FIGURE 4, having a standard diametral pitch which determines the center-to-center teeth spacing, the circular tooth thickness T and circular tooth space width W measured along the pitch circle are equal and the fillet radius FR between the clutch plate teeth contact surfaces and the root diameter is small. These small fillet radii constitute stress risers and concentrate the stress in small radial plate sections RS passing through the radii with the result that fatigue failures generally start as cracks in these small radial sections.

One attempt at stress relieving the standard teeth shown in FIGURE 4 was made by providing a single large or full fillet radius FFR as shown in FIGURE 5. It was found that the radial plate sections RS through the center of this larger radius then becomes the focus of stress and there was no measurable improvement in fatigue life.

Another attempt at stress relief is shown by the undercut structure in FIGURE 6 in which the contact faces of the teeth have been undercut with a large fillet radius LFR leaving a portion of the root diameter between the fillets. This distributed the stress over the large plate mass RS and strengthened the section through the fillet radii providing a structure having increased fatigue life. It was found, however, that in small diameter plates the reduction in the working depth WD or tooth contact face area caused battering problems which result from the plate nutating about the splined hub during clutch release or free running operation.

The teeth and spline structure according to this invenvention and as best shown in FIGURE 3 increases clutch plate life and also adds to the strength of the splined hub structure. It has been found that by providing the largest possible flat 24 tangent to the root diameter and the largest possible fillet radius 26 with respect to the pitch diameter while maintaining full tooth contact area, greatly prolonged clutch plate life results from the redistribution of stress with no accompanying battering problems. The optimum relationships were determined by making the fillet radius 26 equal to the length of the flat 24. For the fillet radius and flat to be maximum, the ratio of circular tooth space width 30 to circular tooth thickness 32 measured along the pitch circle should be a maximum for standard diametral pitch involute teeth spacing and in addition the clearance 34 should be sufficiently large to allow for the large fillet radius without restricting the flat length. In actual mass production practice there is a minimum value for the circular tooth thickness 32 since the spline spaces which the clutch plate teeth occupy should be produced with room for a fillet at their root diameter, as shown, and by a tool such as a hob of sufficient strength to perform the metal removal operation. It has been found that for a 20° pressure angle and with the radial working depth 36 measured from the inner tooth radius to the outer spline radius varying from the ratio $1.5/P_d$ to $1.0/P_d$, where $P_d$ is the diametral pitch which is the ratio of the number of teeth to the pitch diameter, and the tooth thickness 32 varying from 0.20×tooth space width 30 to 0.75×tooth space width 30, the length of the tooth root flat 24 can be made equal to the fillet radius 26 and equal to 0.32×working depth 36 while leaving sufficient clearance 34 equal to 0.25×working depth 36. Within the range of circular tooth thickness equal to 0.20×tooth space width to 0.75×tooth space width, greatly increased fatigue life will occur with the optimum occurring at approximately a tooth thickness equal to 0.45×tooth space width.

In addition to increasing the fatigue life of the friction plates, the increased thickness of the splines has an added advantage where the inside diameter 40 of the hub 16 is undercut or is provided with grooves 42, as shown, to provide a so called "squirrel cage" structure for the distribution of coolant from the hub interior radially outward of the clutch package.

Since the lowest value of the tooth thickness given above is related to a practical method of manufacture, it will be appreciated that the tooth thickness may be further reduced to more closely approach the maximum stress relief condition and maximum spline strength. This is possible provided bending stresses in the clutch teeth, which may be considered as cantilevers, do not exceed maximum permissible bending stress and further provided a more costly method of manufacture than the hobbing method is acceptable.

The above-described preferred embodiment is illustrative of the invention which it is appreciated may be modified within the spirit and scope of the appended claims.

What is claimed is:

1. A torque transmitting member having circumferentially spaced teeth, said teeth having fillet radii, flats tangent to the root diameter, a circular tooth thickness not less than one-fifth no more than three fourths of the circular tooth space width measured along the pitch circle and a working depth not less than 1.00/diametral pitch no more than 1.5/diametral pitch.

2. The invention set forth in claim 1 and said flats and said fillet radii being approximately equal to 0.32× said working depth.

3. An annular clutch plate having circumferentially spaced teeth, said teeth having fillet radii, full tooth contact areas, flats tangent to the root diameter and a circular tooth thickness considerably less than the circular tooth space width measured along the pitch circle, and said fillet radii and the length of said flats being approximately equal.

4. The invention set forth in claim 3 and said tooth thickness of being not less than one-fifth nor more three-fourths of said tooth space width.

5. The invention as set forth in claim 3 and said tooth thickness being approximately 0.45× said tooth space width.

6. The invention set forth in claim 3 and said teeth depending from the interior of said annular plate.

7. The invention set forth in claim 3 and said tooth thickness being not more than approximately three-fourths of said tooth space width.

8. The invention set forth in claim 5 and a member having external splines engaging said teeth with full tooth and spline contact.

9. An annular clutch plate having involute teeth with a nonstandard thickness and a standard diametral pitch providing standard involute teeth spacing and non-standard spaces between the teeth, said teeth having full involute tooth contact areas, said teeth having a reduced circular tooth thickness and a correspondingly increased space between said teeth by the amount of reduction in tooth thickness to provide a tooth thickness not less than one-fifth nor more than three-fourths of the circular tooth space width measured along the pitch circle to provide a correspondingly increased space at the teeth's root circle, a fillet at the root of each side of each tooth having substantially the largest possible fillet radius while maintaining full tooth contact area and a centrally located flat at least substantially as long as the fillet radius.

10. An annular clutch plate having circumferentially spaced teeth, said teeth having full tooth contact areas and a tooth thickness that is small in comparison with the spaces between adjacent teeth, flats tangent to the teeth's root circle in the large spaces between the adjacent teeth and a fillet on each side of each tooth between the contact area and flat having a radius approximately equal to the length of said flats and substantially the largest possible permitted by the small tooth thickness and large tooth space.

References Cited

UNITED STATES PATENTS

| | | | |
|---|---|---|---|
| 2,176,956 | 10/1932 | Cook | 74—462 |
| 2,733,798 | 2/1956 | Almen et al. | 192—69 |
| 2,927,673 | 3/1960 | Sand | 192—69 |
| 3,016,119 | 1/1962 | Rosen Berger et al. | 192—69 |
| 3,245,508 | 4/1966 | Livezey | 192—69 |

FOREIGN PATENTS

| | | |
|---|---|---|
| 431,758 | 3/1948 | Italy. |
| 526,821 | 7/1921 | France. |

OTHER REFERENCES

"Mechanics of Machinery" by Ham, Crane, Rogers, 4th edition, copyright 1958, McGraw-Hill Book Co. Inc., Fig. 4.26 on page 121. This book can be found in the group 340 Library of the U.S. Patent Office, TJ170H361958C2.

MARTIN P. SCHWADRON, Primary Examiner

LESLIE J. PAYNE, Assistant Examiner

U.S. Cl. X.R.

192—70.14